United States Patent [19]

Bullis

[11] Patent Number: 5,598,206
[45] Date of Patent: Jan. 28, 1997

[54] BEAMFORMED TELEVISION

[76] Inventor: James K. Bullis, 1155 Pimento Ave., Sunnyvale, Calif. 94087

[21] Appl. No.: 226,069

[22] Filed: Apr. 11, 1994

[51] Int. Cl.[6] ................................................ H04N 7/18
[52] U.S. Cl. ........................... 348/81; 367/110; 367/113; 367/117
[58] Field of Search ................................ 348/81; 367/110, 367/7, 113, 117; 342/181

[56] References Cited

U.S. PATENT DOCUMENTS

| | | | |
|---|---|---|---|
| 3,447,125 | 5/1969 | Peugh | 340/5 |
| 3,794,964 | 2/1974 | Katakura | 340/1 |
| 4,456,982 | 6/1984 | Tournois | 367/11 |
| 4,688,430 | 8/1987 | Anderson | 73/625 |
| 4,817,434 | 4/1989 | Anderson | 73/625 |
| 4,855,961 | 8/1089 | Jaffe et al. | 367/7 |
| 4,982,384 | 1/1991 | Pipkin et al. | 367/113 |
| 5,033,029 | 7/1991 | Jones | 367/88 |
| 5,090,245 | 2/1992 | Anderson | 73/625 |
| 5,121,361 | 6/1992 | Harrison, Jr. et al. | 367/113 |
| 5,134,884 | 8/1992 | Anderson | 73/625 |
| 5,142,649 | 8/1992 | O'Donnell | 367/7 |
| 5,163,026 | 11/1992 | Peynaud | 367/117 |
| 5,172,343 | 12/1992 | O'Donnell | 367/7 |
| 5,192,978 | 3/1993 | Keeler | 356/5 |
| 5,200,931 | 4/1993 | Kosalos et al. | 367/88 |
| 5,249,046 | 9/1993 | Ulich et al. | 338/95 |
| 5,305,135 | 4/1994 | Chovan | 359/202 |

*Primary Examiner*—Howard W. Britton
*Assistant Examiner*—Anand Rao

[57] ABSTRACT

A system has been invented which produces images comparable to those produced by video cameras. This BEAMFORMED TELEVISION uses a transmitting array, a receiving array, and signal processing equipment to form interactive beams. The transmitting array system provides the capability to resolve the scene in one dimension and the receiving array system provides the capability to resolve the scene in the other dimension. High resolution is achieved with large arrays using unconventional spatial sampling methods with interaction between the two arrays to suppress grating lobe effects. The arrays are long in one dimension and narrow in the other. Grating lobe positions are adjusted by adjusting the transducer spacing such that the combined system response excludes grating lobe effects. Directional transducers are used to provide additional attenuation of grating lobes. Extended near field focusing of transmitted signals is achieved with a simultaneous beam segment focusing system where the volume of interest is divided into a system of transmit beam segments. Transmit beam segments are defined by both range and direction relative to the transmitting array. A unique code is associated with each transmit beam segment such that the reflected signals that are caused by scattering centers in each beam segment are recognizable, unique, coded signals. The received signals are processed to recognize the coded signals thereby identifying the beam segment from which the coded signal was reflected. Thus, the volume of interest is resolved corresponding to the transmit beam segments. The sensed signals are also processed to form receive beams which selectively respond to signals arriving from different directions. The receiving array is arranged so that these beams resolve the position of the scattering centers in another dimension. The data is processed to provide image signals which are displayed in television style format. The processing is done at speeds which provide frame rates suitable for underwater viewing.

49 Claims, 10 Drawing Sheets

BEAMFORMED TELEVISION

BACKGROUND OF THE INVENTION

1. Field of the Invention

The invention relates to creating images by transmitting signals and sensing the effect of objects in the field of view on the signals.

2. Description of the Prior Art

Video cameras have a well known capability to sense visible light and to electronically produce signals that enable a standard television set to display an image. Looking at that image is much the same as looking at the scene directly. It is possible to produce comparable images where visible light methods fail by using other forms of radiating waves. This can be done by beamforming methods where the lens is replaced by arrays of sensors and electronic equipment. This tends to be most useful where the wavelength of the waves is substantially longer than the wavelengths of visible light. The immediate application is in under water acoustic imaging, though there are other applications in medical imaging and radar. In describing such systems, the video camera is the standard of comparison.

Video cameras correctly portray the shape of objects. They provide high resolution to make pictures seem real. They respond immediately to the scene at which they are pointed and they produce pictures at a frame rate suitable for representing moving objects. In deep ocean exploration, under water video cameras are useful if artificial light is provided, but this works only if the camera is close to the object of interest.

For longer range underwater viewing other methods are required. Acoustic imaging systems exist, but these produce images which are much inferior to video camera images. Most existing systems produce images which do not look at all like the scene. Special interpretations skills are needed to understand these images. Also, the equipment capable of achieving high resolution tends to be operationally awkward. The most common underwater imaging systems are side scan sonars. These require a series of exposures to produce an image and the rate that this can be done is satisfactory only for stationary scenes. Forward looking sonars, that have the capability to achieve high resolution, are large and heavy.

There is a clear need for equipment that produces high resolution pictures, directly represents a scene as if viewed by the eye, operates at frame rates suitable for underwater operations, and performs at greater range than an underwater video camera. The sonar engineering community has long been aware of this need but has not, until now, produced equipment comparable to a video camera.

Previous imaging systems, that include coordinated beamforming with transmitting and receiving transducer arrays, are relevant prior art. Transmit beamforming is a process of producing phase related signals that are radiated by transmitting transducers in an array, such that signals from each transducer overlap, with phase relationships that cause concentration of strong signals in a particular direction. Receive beamforming is a process of combining signals that are received by receiving transducers in an array, by adjusting the phase relationships between signals and adding the signals, to cause enhanced sensitivity in a particular direction. The beams produced by these beamforming processes are geometrically described in the same way for both transmitting and receiving systems. The direction of a beam is an angle relative to the array.

Beamforming produces beams which can be used to form images. The beams are used in a system that sends out signals and then senses reflected signals. This is done to individually detect target points in a scene, determine the location of each target point, and enter the detected signal strength, as a level of gray, at the appropriate corresponding position on a display. The detected signal strength is an image signal sample. An image signal is a sequence of such samples. The beams serve to determine the location of the target points because it is known which beams detected that target point.

In optics, a lens is a beamformer that produces an extremely large number of simultaneous beams. For example, 10 million beams can be produced by a one inch lens. A lens usually produces more beams than are needed by the optical system. In optics the resolution cell, or pixel, is often determined by the granularity of the detecting surface. In electronics, it is very challenging to produce enough beams, so the resolution cell is determined by the number of beams.

An important transmitting system method was described in 3,447,125 (5/1969) Peugh. Here was used a transmitting system where a coding system enabled an array beamforming system to transmit many beams simultaneously. The coding system was necessary for simultaneous transmission of many beams where the codes prevented degeneration of the process. The coding system was also essential to localize targets. The special importance of this is that many beams cover a large area as a result of a single burst transmission. This is more important in acoustic systems where it takes significant time for the two way propagation paths. In stationary situations sequential operations can be used to form and scan the direction of beams but this takes a very long time. This ceding method makes rapid image formation possible.

Receive beamforming is a sophisticated technology that has been utilized in conventional forward looking sonar systems for many years.

Simultaneous transmit beamforming and simultaneous receive beamforming are necessary for imaging systems to operate at rapid frame rates such that moving objects can be correctly portrayed or that scenes viewed from a moving vehicle can be correctly portrayed.

The transmit coding method described by 3,447,125 (5/1969) Peugh was included in 3,794,964 (2/1974) Katakura where a comparable beamforming operation was done using an acoustic lens. Here was described an important combination of transmit beams and receive beams where the two sets of beams served to determine position of targets in two orthogonal dimensions. 3,794,964 (2/1974) Katakura created an imaging system using this orthogonal beam technique for medical imaging purposes.

Another combination of transmit beams and receive beams was attempted by 4,456,982 (6/1984) Tournois which also used the method described by 3,447,125 (5/1969) Peugh to create an imaging system where orthogonal transmit and receive beams were used to determine target position. This system used arrays of omnidirectional transducers with beamforming techniques to directly produce the beams. 4,456,982 (6/1984) Tournois rejected the use of a lens. This system used two arrays where, in each array, transducers were arranged along a line. These are called linear arrays.

A linear array produces a beam by the beamforming process defined previously. Far from the array, such a beam can be described as a region between two concentric cones where the line of the array is the common axis and the cones have a common vertex point. The cone angles measured from the axis describe the intended beam. The responsive region fully encircles the axis.

The system described by 4,456,982 (6/1984) Tournois operated to produce many such beams simultaneously, both for transmission and reception. The arrays were arranged perpendicular to each other such that the transmit beams and the receive beams operated as a system to determine the position of target points in two dimensions. One dimension was known by knowing the angle from which signals were received. The other dimension of the target position was determined by the method described in 3,447,125 (5/1969) Peugh. This other dimension was the angle of the transmit beam that covered the target, where that transmit beam was identified by identifying the code of the received signal. For every receive beam there was a set of code channels which represented a set of transmit beams.

The combination of transmit and receive beams can be viewed as two nests of many cones where the cones in each nest have a common axis line and a common vertex point. In a nest, each cone angle is slightly larger than the previous and the cone angles, measured relative to the axis line, range in value from 0 to 180 degrees. As cone angles approach 0 or 180 degrees the angle increment grows larger. The combination is made by arranging the two nests of cones such that their axis lines are perpendicular and their vertex points are the same point. The intersection of these two nests defines many solid angle sectors. These are regions which serve to localize, or resolve, any target in space. Such regions provide positions in two angular dimensions relative to the two arrays. The distance, or range, of a target point from the two arrays is not determined by such a system. A scene to be imaged is typically represented by many target points and their relative positions must be determined to form an image. A target point is a scattering center.

The way these nests of cones interact illustrates problems in producing images with the conventional linear arrays described by 4,456,982 (6/1984) Tournois.

The first problem was the fact that any two orthogonal beams intersect in two directions. This ambiguity could not have been resolved using the linear arrays described by 4,456,982 (6/1984) Tournois and the actual described implementation produced double images. The possibility of other array configurations was mentioned and there are conceivable, though impractical, two dimensional array configurations that would solve this problem. The omnidirectional transducers specified by 4,456,982 (6/1984) Tournois did not allow other, more practical, ways to resolve this ambiguity. A more complicated array system is required where directional transducers contribute to the performance of the array system.

There is another linear array problem that can be visualized in terms of the two nests of cones. Clustered around a boresight direction, that is perpendicular to both cone nest axes, is a set of regions that form an approximately rectangular grid when projected onto a perpendicular planar surface. This cluster area is good for creating an image. At directions far outside this cluster, there is a widening of angle sectors which degrades the resolution. In the diagonal directions, on that planar surface, the intersection of cones begins to form regions that are non-rectangular in shape and the grid becomes large. Assuming that geometric corrections are made, the effect of this is to degrade the image, making it look more granular.

The system produced by 4,456,982 (6/1984) Tournois had the capability to form images over a 180 degree field of view. This included both the desirable and undesirable image areas and provided a wider field of view than usually needed. The simplest way to limit images to a smaller field of view was to just ignore much of the data, so the useful image was formed using only a fraction of the available data points. To improve the resolution in the smaller field of view it was necessary to lengthen the arrays by adding more elements. This improved the resolution over the full 180 degree field of view at a cost of increasing the number of transducers. If the arrays had been simply lengthened using the stone number of transducers then spurious response of the arrays would have caused ghost image problems. The requirement to adequately sample the space was imposed by 4,456,982 (6/1984) Tournois to prevent such undesirable, false image confusion. Conventional array theory dictates the rules for sampling the space. Spatial sampling rules require transducer spacing that does not allow high resolution over a smaller field of view without increasing the number of transducers.

Another significant problem in 4,456,982 (6/1984) Tournois was inadequate means of focusing transmit beams. This is a serious limitation for high resolution systems that use long wavelengths to form images. Operating in the near field means that wavefronts at the array can not be represented as a planar surfaces. It also means that the description of beams, in terms of cones, becomes inexact though it is still accurate enough for much of the interesting operating range. Operating in the near field requires a complicated focusing process for the beamforming operations. Sophisticated means of dealing with this problem for the receive beamforming process are known in sonar engineering. Adequate transmit beam focusing methods are not found in prior art.

3,447,125 (5/1969) Peugh provided for far field focusing only. 3,794,964 (2/1974) Katakura provided the capability to focus at a particular range by use of the lens, where the choice of range was predetermined by the lens and the hardware placement. A flexible capability was needed for underwater operations. 4,456,982 (6/1984) Tournois did not discuss the need for near field focusing capability where it appears that this system was built only far field operations since the need for range dependent focusing was not mentioned. 4,456,982 (6/1984) Tournois described a relatively low resolution system which was less sensitive to near field effects.

For high resolution systems, the necessary focusing system must take into account the different range to different points in the image and focus must be accordingly provided. The beam coding systems of 3,447,125 (5/1969) Peugh, 3,794,964 (2/1974) Katakura, and 4,456,982 (6/1984) Tournois were all based on angle only. These associated a single unique code with each direction. For transmit beams this meant that a single range at which to focus the beams had to be determined before the burst transmission. In the near field this meant that sharp focus existed over a limited range extent. This is the depth of field. The formation of images over an extended field of view, as a result of a single burst transmission, must take into account an additional dimension. The coding system must be based on both range and angle dimensions.

A two dimensional coding system was partly represented in 5,142,649 (8/1992) O'Donnell, where a dynamic transmit beam focusing system took account of both range and angle dimensions. In this imaging system a different method of image formation was used where one array was used for both transmitting and receiving and coordinated operation of two arrays was not involved.

4,855,961 (8/1989) Jaffe et al. described related prior art where a useful coding system is included as part of another kind of system. In this system each transmitter has the capability to form an exclusive beam as a result of its own size and characteristics and each transmitter does not depend on interaction with other transmitters to form a beam. This does not fit the definition of beamforming, used in this document, where radiation from the transducers overlaps and interacts to form a beam. This related invention suggests an unconventional array method where the ghost problems brought about by sparse spatial sampling are suppressed by the directionality of the individual transmitting transducers.

Thus, there is prior art that includes important relevant technologies, but previous imaging systems are limited in capability. The array methods of 4,456,984 (6/1984) Tournois required high density arrays which limited the ability to efficiently form high resolution images over a useful field of view. 4,456,984 (6/1984) Tournois required omnidirectional transducers which also limited ways of achieving adequate performance. The coded beamforming systems of 3,447,125 (5/1969) Peugh, 3,794,964 (2/1974) Katakura, and 4,456,982 (6/1984) Tournois failed to provide for extended depth of field focusing which made near field operations unsatisfactory. The need for a system that correctly portrays the shape of objects, provides high resolution, operates over an appropriate range, and can adequately show moving scenes is not satisfied by prior art systems.

The patents referenced in this document are incorporated by reference. In case of conflict, the present document takes precedence in all respects.

The general object of the present invention is to produce images with array beamforming methods that are comparable with standard television images. The popular video camera is the basis of comparison. An immediate object is to provide a system that will operate compatibly with underwater video cameras to improve underwater exploration systems. A complete underwater exploration system is also an object of this invention.

The present invention is a beamformed television system. Objects of this invention are accomplished with features that are represented in prior art systems, features that are known in sonar engineering practice, and some important new technological developments that replace features of prior art systems. These features are advantages of the beamformed television system.

An object of the beamformed television system is to form images in rapid succession. An advantage is a high speed image formation method based on simultaneous beamforming methods, both in a transmitting system and a receiving system.

An object of the beamformed television system is to provide a large number of resolution cells using an orthogonal beam system where beams are formed in transmitting and receiving systems. An advantage is an electronic beamforming method that is more flexible than the acoustic lens method.

An object of the beamformed television system is to efficiently achieve high resolution over a useful field of view. An advantage is an unconventional array system that enables this objective without requiring the large number of transducers called for by conventional array sampling rules. A related object is the suppression of ghost images that arise with unconventional spatial sampling array methods. An advantage is an interactive array method, which effectively suppresses ghost images. This enable the previous advantageous feature.

Objects of the beamformed television system are to resolve the front to back ambiguity and to provide further attenuation of unwanted signals. Advantages are a complex array system that uses directional transducers which provide the necessary capabilities. Omnidirectional transducers fail to provide the needed discrimination.

An object of the beamformed television system is to produce sharply focused images over an extended field of view in a single exposure operation. An advantage is a beam segment coding system that is based on the two dimensions of range and angle where focusing is achieved over the required number of beam segments. A beam coding system that is based on angle only does not have the flexibility to provide an extended field of view capability.

The described objects of the beamformed television system are necessary to meet the general object of this invention. The associated advantages are the features of this invention that enable it to achieve the objects and, hence, achieve the general object where prior art inventions do not satisfy this need. No prior art system is available that is comparable with a video camera. The intended complete underwater exploration system is not possible without this capability.

Further objects and advantages of the present invention will become apparent from a consideration of the drawings and ensuing description.

SUMMARY OF THE INVENTION

A beamformed television system has been developed that provides high resolution images that represent a scene as if directly viewed by the eye. Frame rates are suitable for underwater viewing and the range extends well beyond the range capability of underwater video cameras.

This system uses orthogonal transmitting and receiving arrays that interact to produce the necessary two dimensions of resolution. Transmit coding methods are included that make this possible. A single burst transmission produces signals that cover the scene of interest and these are processed to form a completed image. Array beamforming methods are used to create the necessary transmit and receive beams. The perpendicular relationship between the arrays allows the simultaneous transmit beams to locate points of a scene in one dimension and the simultaneous receive beams to locate points of a scene in another dimension. The capability to locate many points corresponds to the capability to produce high resolution images.

An important distinguishing feature is a high resolution capability where this resolution is concentrated in a field of view that is a useful size. This is done with large arrays where the transducer spacing violates the conventional array sampling rules. The two arrays mutually interact to suppress the spurious responses that arise. An extension of the one dimensional beam coding system allows this to be done where transmit beams are coded in two angular dimensions.

Directional transducers are used to resolve the front to back ambiguity inherent in linear array systems. Directional transducers contribute, also, to suppression of spurious responses of the sparse arrays.

Another important distinguishing feature is the capability to focus over an extended depth of field. This is done with a beam segment transmit, Coding system where beams are divided into range increments and each such beam segment is associated with a unique code. Different codes are transmitted in the same direction at the same time. In a given transmit beam segment the beamforming process provides the necessary signals to sharply focus image points within that beam segment. In the receive beamforming process the phase adjustments are varied as a function of time to sharply focus the image points at all ranges within a receive beam.

The sparse array configuration and the beam segment focusing system both involve transmit signal coding. Processing is done on the received signals to sort the many complex codes and to form channels that correspond with the codes such that information derived from transmission operations is represented in the image signals.

The imaging system includes the processing necessary to form an image which is in a format that can be readily interpreted. A vehicle is included for ocean exploration operations.

This system has capabilities that are comparable to those of a video camera except that acoustic energy is used instead of visible light. Use of other forms of radiating wave signals is possible with this system. This includes electromagnetic energy. Acoustic applications are preferred. The full acoustic imaging system is called beamformed television.

DESCRIPTION OF THE PREFERRED EMBODIMENT

The preferred embodiment will here be described. This description is for a particular implementation which is an illustration of a presently preferred embodiment. The scope of the invention should be determined by the appended claims and their legal equivalents and not by the example given.

DRAWINGS

Figure 1:
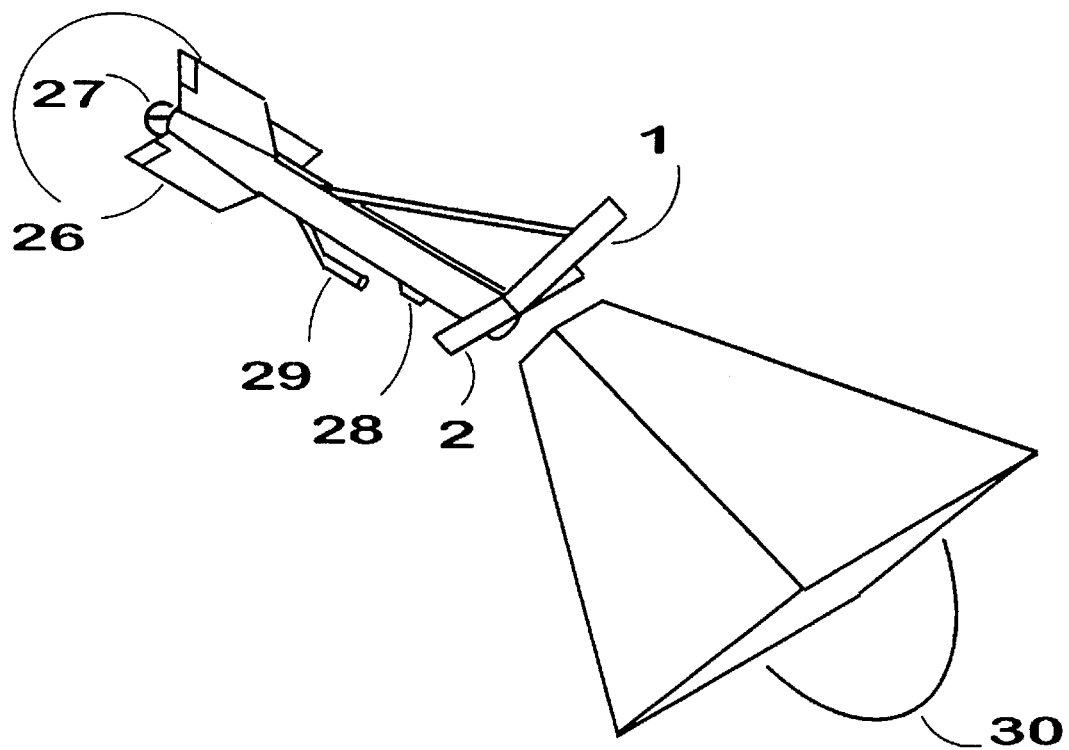

FIG. 1—an imaging system including a vehicle.

Figure 2:
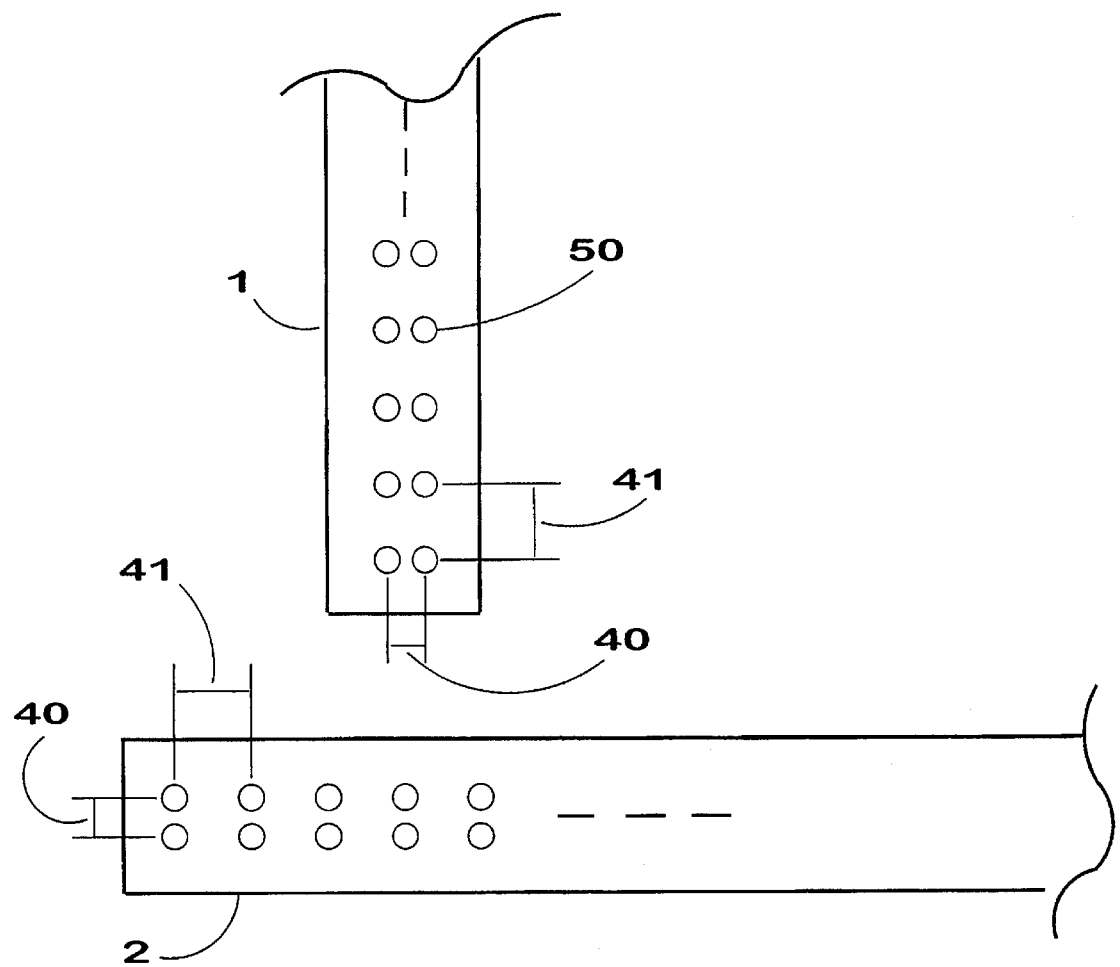

FIG. 2—a diagram showing the configuration of the interactive arrays of directional transducers.

Figure 3:
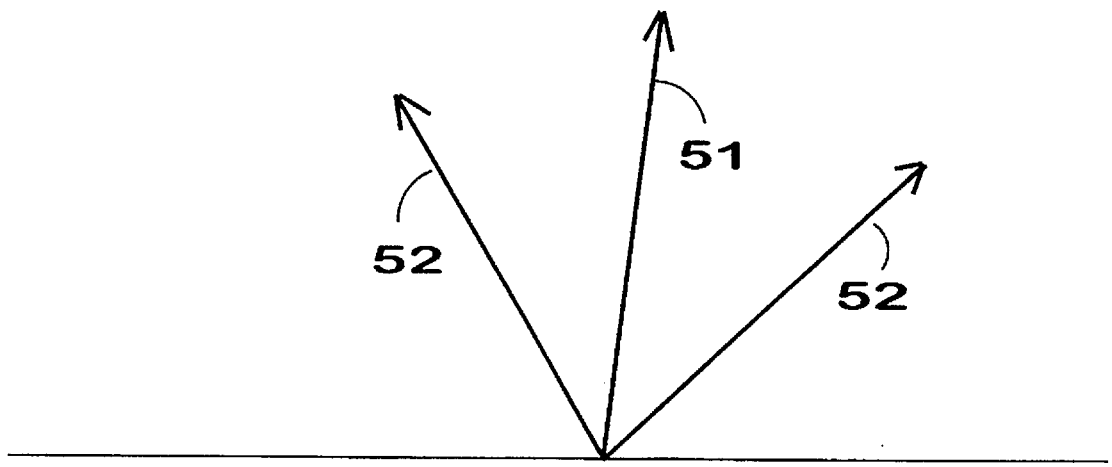
Figure 3:
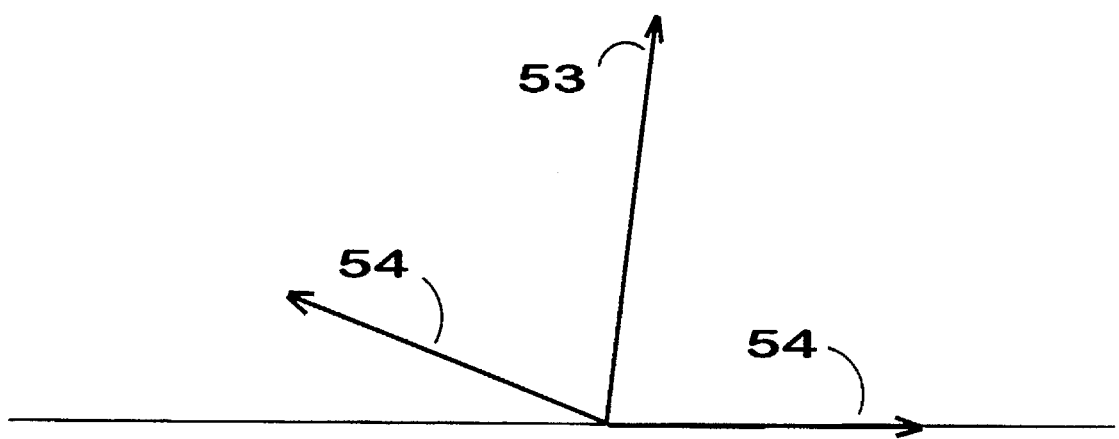

FIG. 3—a diagram showing relative positions of main beams and grating lobes for two arrays.

Figure 4:
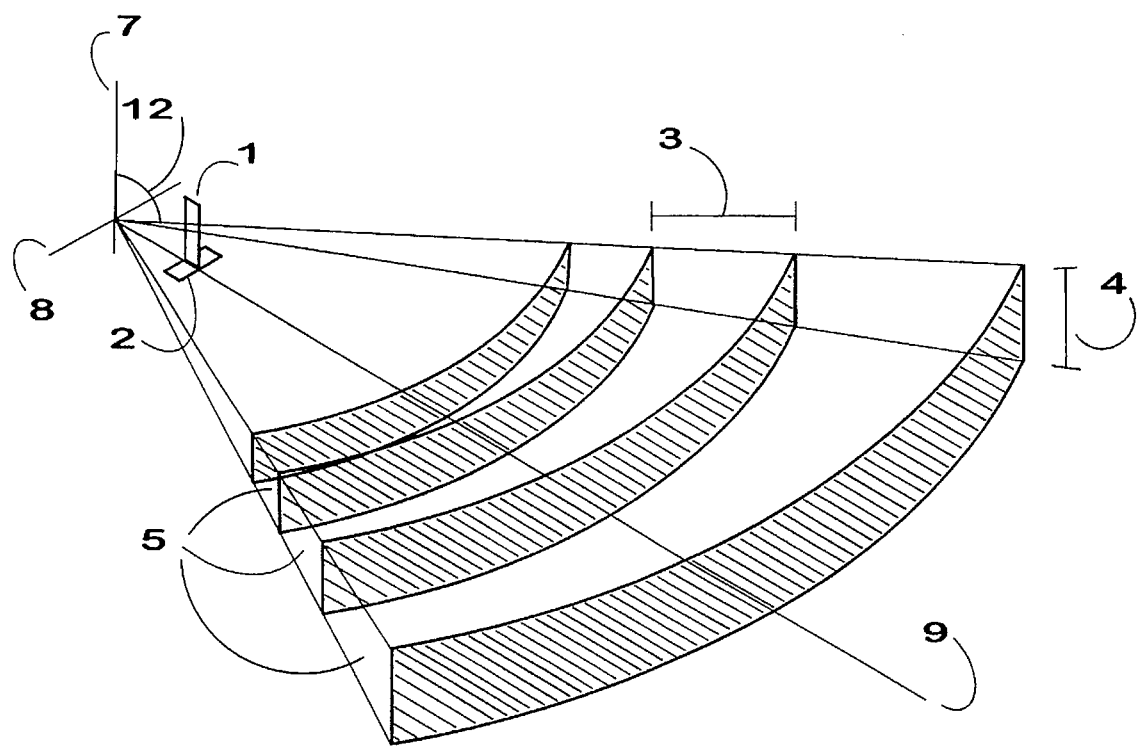

FIG. 4—a diagram showing the formation of transmit beam segments.

Figure 5:
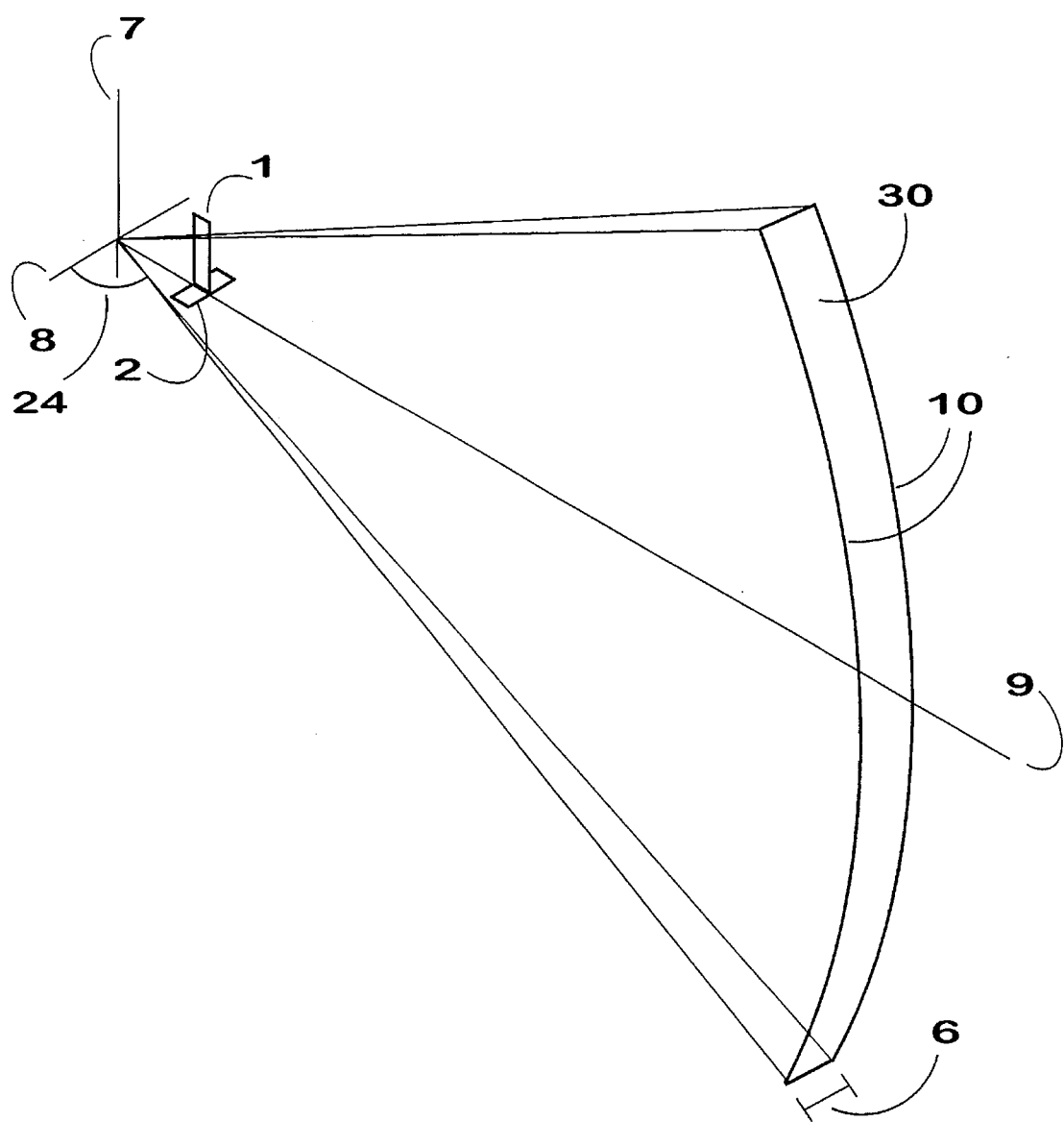

FIG. 5—a diagram showing the formation of a receive beam.

Figure 6:
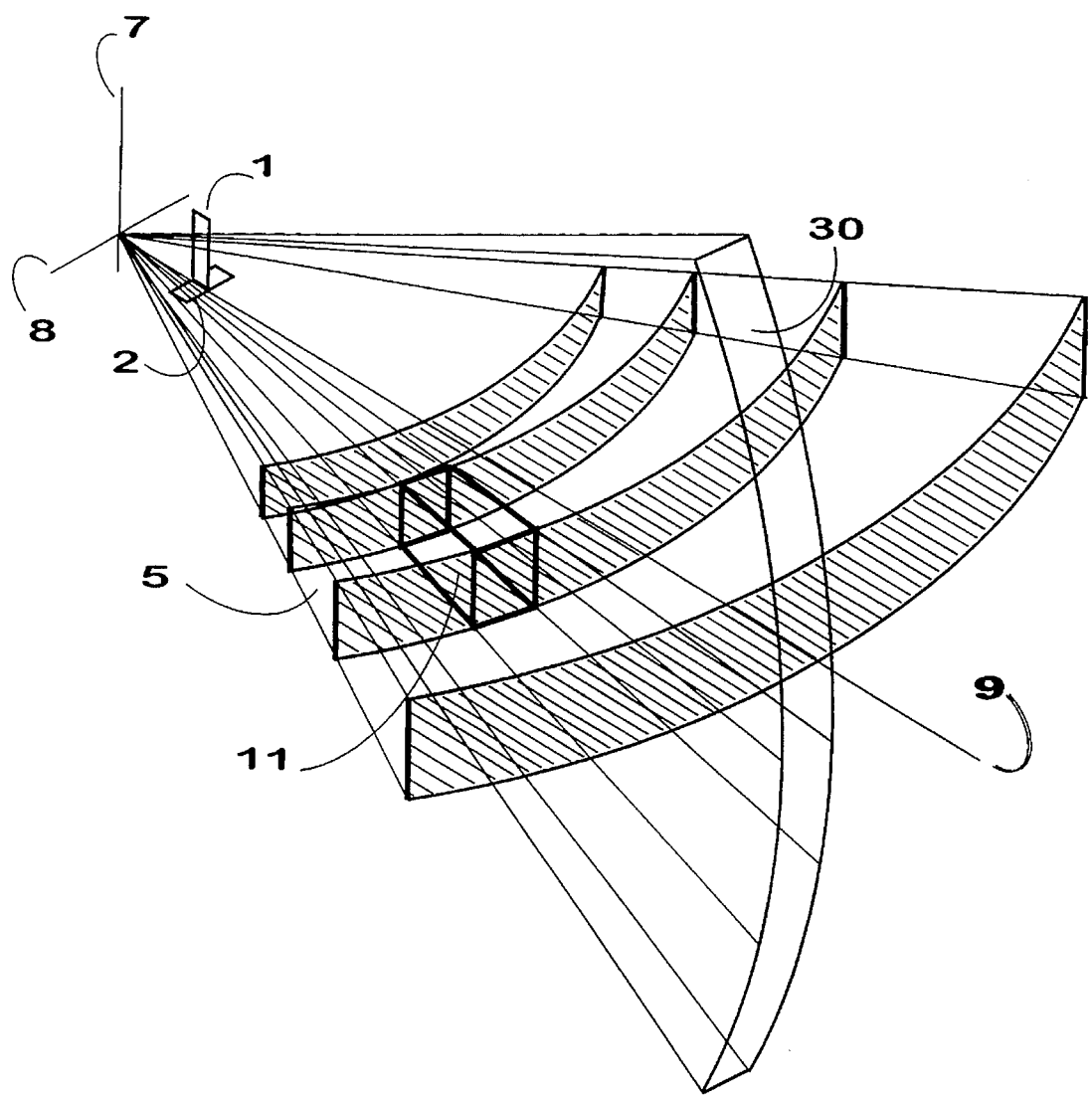

FIG. 6—a diagram showing the intersection of a transmit beam segment and a receive beam.

Figure 7:
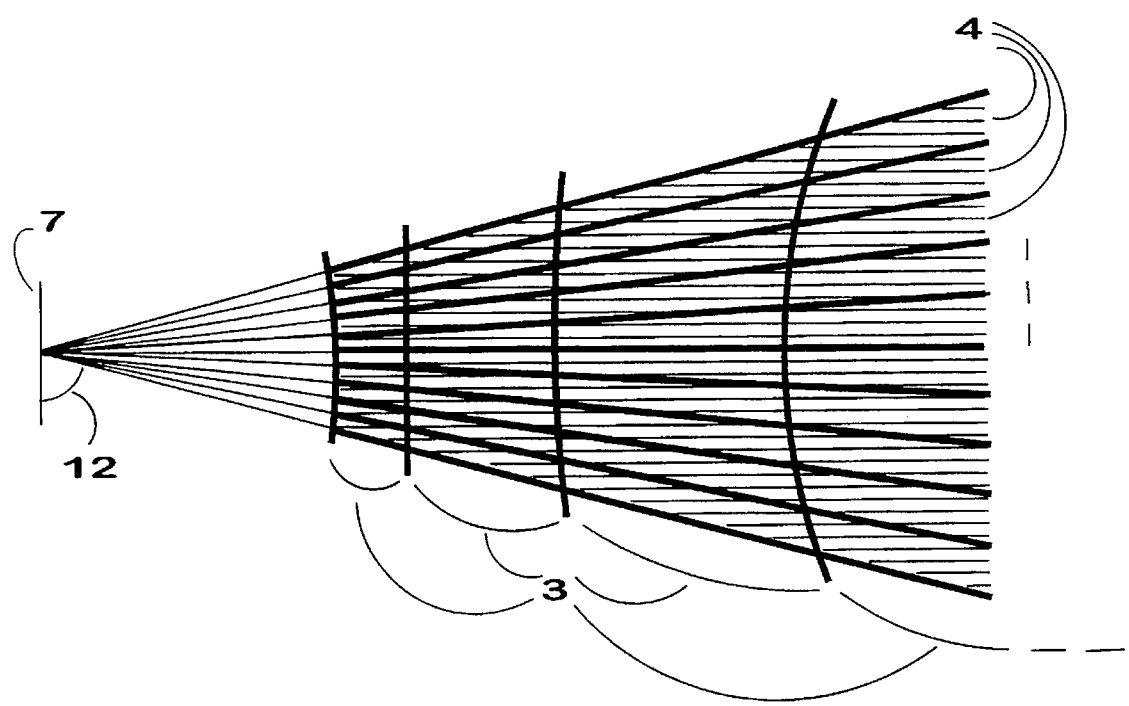

FIG. 7—a diagram showing the formation of beam segments by dividing a plurality of angle sectors into a plurality of range zones.

Figure 8:
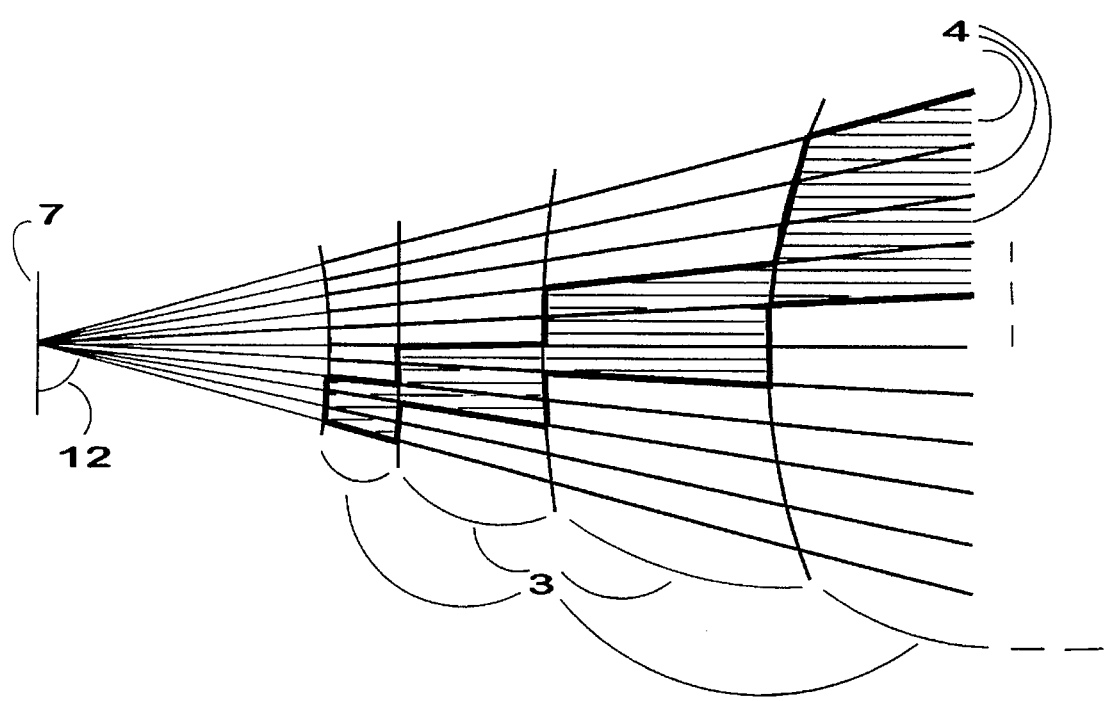

FIG. 8—a diagram showing the formation of beam segments by combination of a plurality angle sectors and a plurality of range zones.

Figure 9:
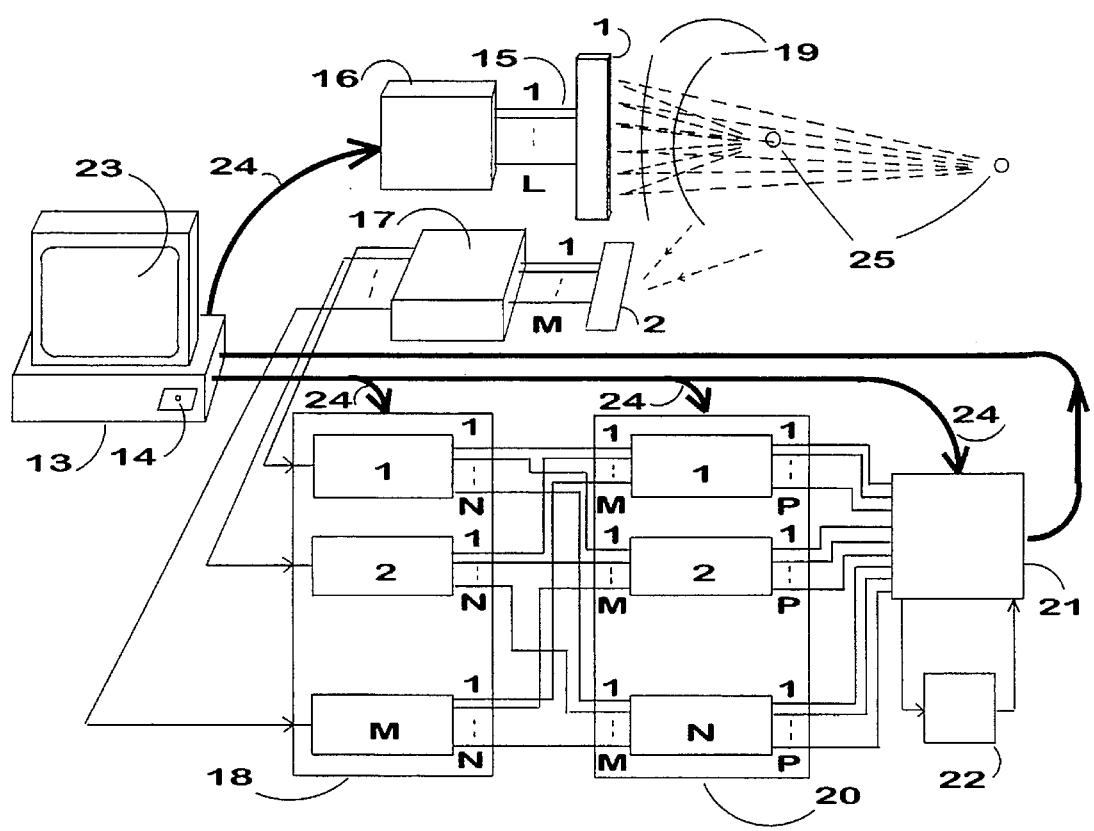

FIG. 9—a diagram of a system which is an embodiment according to the invention.

Figure 10:
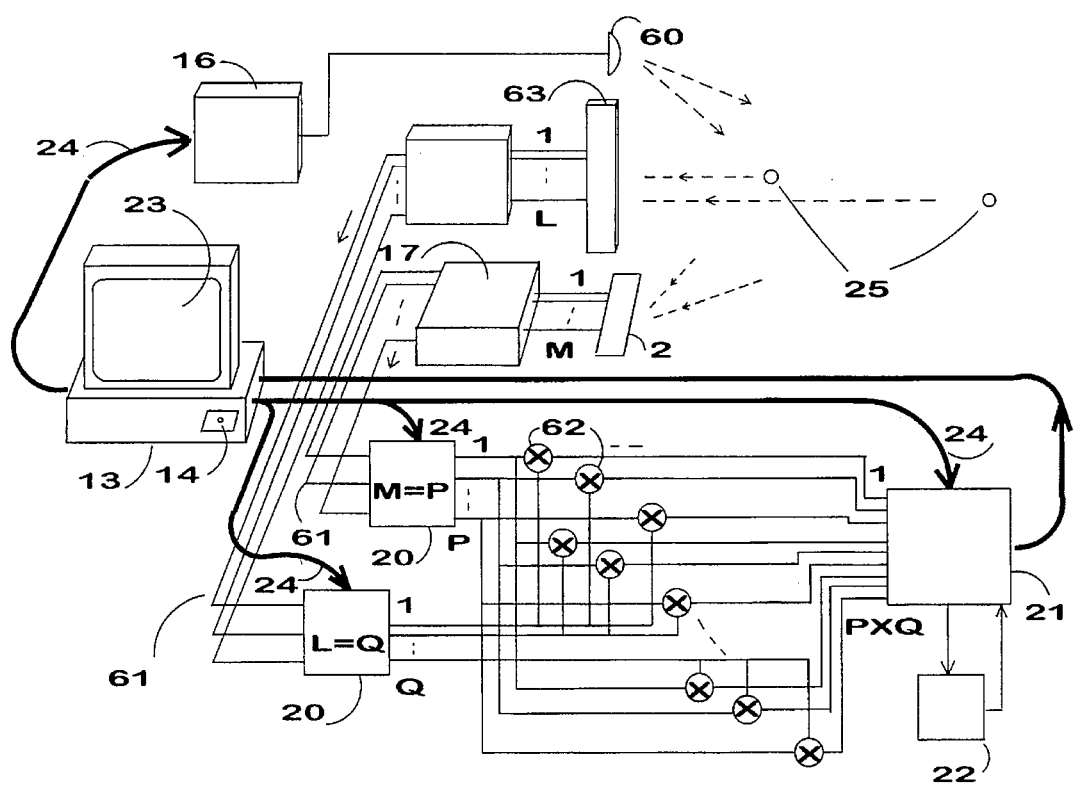

FIG. 10—a diagram showing an alternative system.

The preferred embodiment of this beamformed television system is used for viewing the terrain deep in the ocean. It is constructed of orthogonal linear arrays located in proximity to each other which are constructed of many transducers. The arrays are two dimensional with length much greater than width. FIG. 1 shows the transmitting array 1 and the receiving array 2. The field of view 30 is depicted with dashed lines since it represents a region which projects over the scene of interest. The field of view is in a direction perpendicular to both arrays.

The arrays are mounted on a vehicle which may be self propelled or towed. Signal processing and display functions are done in the vehicle and on board a tending vessel. FIG. 1 depicts a vehicle which is included as part of the system. It includes means of stability 26, means of propulsion 27, follow up imaging capability 28, and remote tool capability 29.

FIG. 2 shows the configuration of transducers in the arrays. There are 128 transducers in each array in a 2×64 arrangement. The spacing between transducers, on center, is approximately one wavelength in the width direction 40 and approximately two wavelengths in the length direction 41.

An image produced by this beamformed television system appears to the human observer like the image on a commercial television set. It produces images of under water scenes at ranges from about 10 to 30 meters with a quality that is comparable with common television systems. This embodiment is a black and white system.

The transmitting array and the receiving array interact to resolve the scene. The resolution is determined by the width of the beams that are formed. This width, in radians, is approximately equal to the ratio of the wavelength to the array length.

A radiation pattern shows the complete beamformed directional response of an array including the intended beam direction and in all other directions where side lobes and grating lobes occur. Grating lobes are unwanted increases in the response caused by periodic effects that include sparse spatial sampling effects. A grating lobe is sometimes called a spurious response. Array radiation patterns apply to both transmitting and receiving arrays.

In the discussion of the background of the invention in this document, a system of beams formed by a linear array was described as a nest of cones, where each beam is the region between two cones. The angle between the two cones is made very small by making the arrays long, but that leaves a complete 360 degree region of main beam response that is still between the two cones. This beamformed television retains the narrow beam characteristics but imposes limits on each beam in the wide dimension by use of the second, narrow, dimension of the array and beamforming in this dimension also. The resulting beam can be described as a fan. Two sets of fan beams are formed by the two dimensional beamforming process. There is a set of fan beams that cover each half of the field of view for each array. Since the arrays are perpendicular these halves divide the field of view into four quadrants. In this system, 64 beams are formed to cover each quadrant.

The beamformed television system uses transducer spacing that creates grating lobe effects. These grating lobes appear on each side of the main beam, but are separated by a significant angle. In one angle dimension the grating lobes are separated from the main beam by one angle. In the other dimension the grating lobes are separated from the main beam by another angle. These angles differ by a factor of two. Grating lobe angles are adjusted by adjusting the transducer spacing. The two arrays interact to mutually cancel spurious responses in the opposite array because a spurious response from one array does not coincide with a spurious response from the other. FIG. 3 shows the direction of a main beam 51 and spurious response 52 formed by the long dimension of an array. FIG. 3 also shows the direction of a main beam 53 and spurious response 54 of the beams formed by the short dimension of the arrays. The main beams of the two arrays do coincide so that target points at these angles will be correctly seen. Actual dimensions require fine tuning of these directional patterns with consideration for the full directional characteristics of the radiation patterns which include the effects of individual transducer directionality.

The interaction takes place because an image signal is a sequence of signal samples that have an amplitude determined by the response of both arrays. A target point must be present in a transmit beam and a receive beam at the same time if an image signal is to be received. If there was a direction where both arrays had a spurious response then another target point would cause an image signal which would be falsely positioned. The system response is the product of the two radiation patterns. By controlling the position of the spurious responses the arrays mutually suppress these spurious responses.

A total of 256 unique codes are transmitted to enable the transmit beams to work in this way. Narrow band coded waveforms are used so that the total bandwidth is not excessive. Narrow band coded waveforms do not provide fine grain range resolution which is usually the objective for sonar equipment. Video cameras do not provide any range resolution.

The beamformed television system is Doppler insensitive. The codes are arranged so that Doppler effects shift the image as a whole. Velocity errors shift the image up and down on the display screen. When the shift is excessive, an adjustment is made.

The transducers are, individually, directional in response. This prevents a front to back ambiguity that would otherwise be a problem. The directional response also helps to attenuate the spurious response of the arrays which was described previously. This effect is applied to spurious responses of the same array and of the opposite array so it is a double attenuation effect. FIG. 2 shows an array of directional transducers 50.

The array radiation patterns are modified by weighting of the transducer signals by adjusting amplitude and phase of individual transducers. This is done for transmitting and receiving systems.

The transducers must be individually constructed and assembled in an array such that they do not allow damaging stray coupling. A modular array construction method is used where a fraction of the total number of transducers is assembled as a module which is a water tight enclosure. Transducers within the module share signal and control lines. The whole array is then assembled from many such modules. This construction method provides array production and maintenance efficiency.

The transducers themselves include impedance matching devices to provide effective coupling to the water with sufficient bandwidth to handle all the codes required.

Many codes are required for the basic localization method. This was doubled by the grating lobe suppression method. It was again increased by a factor of four to provide the extended field of view capability which is now described.

The extended depth of field focusing capability is provided by a beam segment transmit coding system. This involves the additional dimension of range for each transmit beam. FIG. 4 shows the formation of transmit beam segments as a beam that is divided into range. segments. The beamformed television system produces signals that focus sharply in each beam segment. Sharp focus means that signals that arrive at any point in the beam segment have a phase relationship such that the sum of these signals is within 3 dB of the sum of phase adjusted variations of the same signals at that point, where the phase adjustments cause the signals to be all in phase.

This beam segment transmit coding system is a two dimensional transmit coding system. One dimension is range which is divided into zones. The transmitting array elements must produce signals which are differently focused for each range zone in order to achieve sharp focus over the volume of interest. The other dimension is angle which is divide into beams where a beam is an angle sector. The combination of these two dimensions is described in reference to FIG. 4. The transmitting array 1 and the receiving array 2 are perpendicular to each other. The boresight direction 9 is perpendicular to both arrays. This transmit coding system establishes a set of transmit beam segments 5. A range zone 3 is the region between the shaded surfaces. The range zones become wider with increasing range until the last one, which is in the far field, where there is no outer boundary. Angle sectors 4 are defined in terms of angle 12 relative to a reference line 7 parallel to the transmitting array. A transmit beam segment 5 is determined by the intersection of a transmit range zone 3 and a transmit angle sector 4. A unique code is associated with each transmit beam segment. Each unique code is generated through the transmit beamforming process where the correct time delay is provided to focus at that particular beam segment. All beam segments are formed by a single burst transmission. The completion of the transmit coding system is the process of code recognition and associated channel formation which is done in the received signal processor.

FIG. 5 shows the formation of a receive beam. It is defined as an angle sector 6 where angles 24 are measured in reference to a line 8 parallel to the receiving array. The dashed lines indicate the region over which a receiving system channel is sensitive. The boundary lines 10 are for illustrative reasons and do not represent a boundary in any functional sense.

The ultimate system resolution cells, or pixels, are formed by the combination of transmit beam segments and receive beams. FIG. 6 shows the intersection of a transmit beam segment and a receive beam to form a box which is a system cell 11, the edges of which are shown as heavy lines.

FIG. 7 and FIG. 8 show different arrangements of transmit beam segments which are among the options to be selected depending on operational needs. FIG. 7 shows the complete system where focus is sharp over the full volume. In these figures the multiple transmit beams are shown as angle sectors 4 which are arranged according to angle 12 relative to a line 7 parallel to the transmitting array. For some search operations the arrangement of FIG. 8 is appropriate where a particular scene expectation can be spanned with a less comprehensive coverage. This latter arrangement is analogous to eye glasses which are called trifocals. Such analogies are inexact since this is a transmitting system which has no direct counterpart in human vision.

It should be noted that the geometrical descriptions are inexact representations, especially in the near field. Also, the range zones are established with overlap of adjacent range zones. The range zone boundary shapes are optimized for operational needs.

The processing system of this embodiment includes a combination of hardware types and the necessary software. Hardware includes analog and digital circuits and both general and special purpose computers. Digital signal processing is an important part of the system which helps to perform the processing very efficiently. This is a changing field with new, more powerful hardware continually appearing. Still, the functions remain equivalent.

The system functions are depicted in FIG. 9 for the preferred embodiment. The signals used to drive the transducers 15 are based on the coded signal waveforms generated in a general purpose digital computer 13 using software 14. The soft, ware determines the signal code samples and includes modifications to the code to take into account Doppler effects, provide aperture weighting functions and a variety of system compensations including compensation for imperfect matching of the transmitting transducer elements. Recognition of the code is done after reception.

The engineering of the signal burst generator 16 provides for a linear capability such that components of the drive signals do not mix and such that the times when the transducer output saturates are infrequent. It also provides drive signals 15 to drive a large number of transmitting array 1 transducers simultaneously.

If there is motion of the system relative to the scene being imaged or if there is motion of an object in a scene and viewing of this object is desired then the received signal waveform is not the same as the transmitted signal waveform and the signals used for comparison in the code recognition process are modified to compensate for the Doppler effect. Both types of signal waveform modification are implemented in software 14.

Piezo-electric devices in the transmitting array 1 convert the drive signals to acoustic wave signals which radiate over the scene to be observed. The signals from the transmitting array elements are phased so as to focus at different ranges. The wavefront curvatures 19 show this. The signals from each element are a composite so that both curvatures are created simultaneously. A portion of each composite signal is the signal which provides the close in curvature. Another portion provides the far away curvature. They function as if they were separate because of the coding system. A number of such curvatures are provided for each zone and the process is repeated for all transmit beams.

The scattering centers 25 reflect a portion of the incident signal energy. The reflected signals are received by the receiving array 2 where piezo-electric devices convert the acoustic signals to electrical signals.

The signals from the receiving array transducers are mixed, filtered and converted to digital form 17 and then subjected to the code recognition process 18 which separates the composite signal waveforms into code channels. Receive software 14 controls this process through the same general purpose digital computer used to generate the transmit signal waveforms. The receive software provides the comparison waveforms and appropriate control instructions 24 for the system.

There is a code channel associated with each of the transmit beam segments previously described with reference to FIG. 4. The simplest coding system associates a discrete single frequency with each transmit cell. Recognition of the codes is accomplished with a commercial integrated circuit device which performs discrete Fourier transforms using well known FFT techniques. These Fourier transforms complete the coded transmitting system. Fourier transforms are a method of implementing filter channels. Each channel responds to a particular frequency. Motion of the imaging system must be compensated for so that Doppler shift will not put signals in the wrong channels. Other codes are available through the computer.

Returning to reference to FIG. 9, the receive beamforming process 20 is depicted. This beamforming system establishes a set of receive cells for each signal code channel. The system is organized where the signals received are stored in blocks which represent receive range zones. These are not the same as the transmit range zones. These receive range zones must be sufficiently small that compensation for wavefront curvature can be accomplished with a single set of phase or time delay adjustments for the signals received in the time interval associated with each receive range zone. This focusing has a counterpart in the transmitting system, but hardware considerations and the desire to provide measurement of distance resulted in a greater number of receive range zones.

The signal processing must be fast enough to complete the processing of the collection of signals received as a result of a burst transmission in a time interval determined by the transmission burst interval. An integrated circuit FFT device provides the necessary speed. Signal samples are represented as complex numbers. These samples are stored in buffered memory blocks where switching of buffers enables successive processing functions. Matrix inversion and reverse order of bits operations are instantly accomplished by enabling of different buffers.

The order in which the code recognition process and the receive beamforming process are performed is interchangeable without effect on the concept. Practical considerations in the design of the signal processor determine this order. Beamforming in the receiver is sometimes described as channel formation or forming channels. The beams are described as parallel channels when, in fact, these channels are organized in the digital processing system using sequential and parallel methods which are functionally equivalent to parallel channels. Code channels are similarly produced by the digital processing. Forming a channel means that the signals are stored such that their amplitude is known as a sequence of numbers in memory and that they occur at the appropriate sampling rate to appropriately represent the signal waveform.

There is a processing economy measure that can be taken by recognizing that the signal codes associated with the shorter range cells need not be processed at the later times of reception and the signal codes associated with the longer range cells need not be processed at the earlier times. Code sets are shifted as a block by changing a local oscillator frequency.

Continuing in reference to FIG. 9, the display processing 21 necessary to create a useful image is included. The television style of image requires processing which includes integration of the data over the path of the two angles which are the coordinates of each pixel and conventional mapping of data values to the appropriate address of display memory. Because of the way the coding system is done a sharp image will be obtained for objects which appear anywhere throughout, a large volume of space. A display of the amplitude of the integrated signal level is represented as a level of gray.

Time of arrival measurements 22 are included in the system where performance depends on the waveforms used. There is a coarse degree of time of arrival data intrinsic to the method of performing the receive signal processing in time of arrival blocks but some code options give greater time resolution.

Software 14 includes the capability to produce signals that are Doppler adjusted to match the velocity of selected objects that are moving such that those objects are enhanced and the background is suppressed.

This data can be used in a variety of types of displays off line but the operational display is a visual format device 23 similar to a commercial television screen. This screen is also the computer screen.

Options include analytic displays which include a variety of representations of three dimensional scenes. Stereo display systems are used to give an operator depth perception.

Virtual reality techniques are applied to enhance perception by an image interpreter.

The computer 13 controls all functions using software 14 and the cables 24 carry the control signals.

OTHER EMBODIMENTS

The useful embodiments of this beamformed television system method include other fields where visible light based imaging systems fail. There is no requirement as to wavelength, but the more useful applications are where the wavelength is substantially longer than visible light wavelengths. The special quality of waves having longer wavelengths is that they can penetrate much intervening material that would block shorter wavelengths.

Radar applications include equipment that would replace visible systems in fog conditions. Such applications would utilize antennas instead of the transducers used in acoustic systems. The system would be varied where the number of codes could be reduced because the requirement for complete image formation, as a result of a single burst of simultaneous signals, is relieved. A combination of simultaneous and sequential transmission would be appropriate in some applications because the speed of electromagnetic waves is so much greater than the speed of acoustic waves.

Medical imaging and seismic prospecting are also possible areas of application of this system.

The system described is a black and white system. A color system application is a multiple band version of that system. It involves more channels and, probably, parallel arrays but this could depend on technologies that may emerge. Where signal processing advances provide adequate processing speeds, the methods of beamformed television can be applied to produce more imaging capability.

An interesting variation is a system where the two arrays are both receiving arrays. The interactive unconventional arrays, which mutually suppress spurious responses of the other, would function in this system also. The interaction could be brought about by multiplying each beam signal from one array with each beam signal from the other array. This would produce a full two dimensional set of image signals. FIG. 10 shows an alternative system which is a modified form of the system shown in FIG. 9. Here a wide angle transmitting source 60 is used and a second receiving array 63 is required. The beamforming operations 20 are doubled. There are P beams formed by the horizontal array system and Q beams formed by the receiving array system. The multiplication process 62 replaces the code recognition process. This multiplication process combines these beam systems to produce P X Q beams, which correspond to pixels. The input signals 61 are complex number samples and the multiplication process 62 is a complex number process. The actual multiplication process includes integration to form image signals. In this alternative system the transmitting system is much simplified and the code recognition process is not required. An advantage of this alternative is a reduction in the bandwidth requirements of the coding system. Two arrays of transducers are still required and an additional transmitting transducer is required. The multiplication process may not be as fast as the code recognition process.

There are other combinations where the described coding method and interactive array method are embodied to produce image signals. The appropriate combination depends on the available hardware. Many possible embodiments are functionally equivalent to the preferred embodiment where different signal processing technologies are used. There are viable digital signal processing technologies and analog signal processing technologies. Equipment possibilities are constantly changing. Other functional equivalents are possible where the order of processing is simply interchanged.

These variations are all forms of beamformed television. What is claimed is:

1. An imaging apparatus comprising:
    (a) a plurality of transducers in a transmitting array where said transducers simultaneously transmit signals, and said signals are mutually phase related and are radiated over a common field of view wherein objects modify radiated signals, and said transducers are arranged to shape a beamformed directional transmitting response that includes a transmit beam and transmit grating lobes at predetermined angles, and
    (b) signal means of generating, phase adjusting and distributing phase related transmit signals to cause simultaneous, coded signal transmit beams to form in respective transmit regions of said common field of view so as to identify said transmit regions by a unique code of a beam passing through a region, and
    (c) a plurality of transducers in a receiving array where said transducers simultaneously receive signals, and said signals are mutually phase related and are radiated from common points in said common field of view after modification by said objects, and said transducers are arranged to shape a beamformed directional receiving response that includes a receive beam and receive grating lobes at predetermined angles, and
    (d) signal means of phase adjusting and combining received signals to cause receive beam channels to form where said receive beam channels are associated with respective receive regions of said common field of view, and
    (e) signal means of processing signals, from each of said receive beam channels, to separate coded signals and to form code channels for respective unique codes, where said code channels are associated with respective said transmit regions, and
    (f) a predetermined relative orientation of said transmitting array and said receiving array to enable said transmit regions and said receive regions to determine locations, in two angular dimensions, of respective said objects in said common field of view, and to enable suppression of the effect of said transmit grating lobes by interaction of said beamformed directional receiving response and to enable suppression of the effect of said receive grating lobes by interaction of said beamformed directional transmitting response, and
    (g) signal means of processing signals to form image signals.

2. An imaging apparatus according to claim 1 where said plurality of transducers in a transmitting array are directional transducers.

3. An imaging apparatus according to claim 1 with a modified arrangement of signal means of (d) and (e), where said modified arrangement comprises:
    signal means of processing received signals to separate coded signals and to form code channels for respective unique codes, where said code channels are associated with said respective transmit regions, and
    signal means of phase adjusting and combining signals from said code channels to cause receive beam channels to form where said receive beam channels are associated with respective receive regions of said common field of view.

4. An imaging apparatus according to claim 1 where coded transmit beam segments serve to identify range zones of said solid angle sector regions of said common field of view by respective codes of said coded transmit beam segments that focus within said range zones.

5. An imaging apparatus according to claim 1 where coded transmit beam segments serve to identify range zones of said common field of view by respective codes and said coded transmit beam segments focus within said range zones, and a combination of range zones and angle sectors serve to focus said radiated signals for an expected scene.

6. An imaging apparatus according to claim 1 with equipment to provide measurement of a total of a distance from the transmitting array to each target and a distance back to the receiving array.

7. An imaging apparatus according to claim 1 with signal means to allow for Doppler effect so as to compensate for motion of a selected collection of scattering centers in a scene such that only said selected collection of scattering centers is viewed.

8. A system comprising equipment according to claim 1 and an underwater vehicle.

9. An imaging apparatus comprising:

(a) a plurality of transmitting transducers in a transmitting array where said transmitting transducers simultaneously transmit radiated signals, and said radiated signals are radiated over a common field of view wherein objects modify said radiated signals to cause reflected signals, and (b) signal means of coding, phase adjusting, and distributing transmit signals that drive said transmitting transducers such that radiated signals form into a plurality of simultaneous, coded transmit beams that serve to identify transmit regions, that are solid angle sectors of said common field of view, by respective codes of said coded transmit beams passing through respective said transmit regions, and said coded transmit beams are simultaneously produced by a single burst transmission, and (c) a plurality of receiving transducers in a receiving array where said receiving transducers simultaneously sense said reflected signals, and thereby produce received signals, and (d) signal means of combining signals to form receive beam channels that are associated with respective receive regions, and signal means of processing signals to separate coded signals such that code channels are formed where code channels are associated with respective said coded transmit beams, such that for each of said receive beams there are as many said code channels as there are said coded transmit beams, and (e) said transmitting array and said receiving array are relatively oriented to enable said transmit regions and said receive regions to determine location of said objects in two angular dimensions, and (f) a configuration of said transmitting array to shape a beamformed directional transmission response wherein transmit grating lobes are at angles that are determined by spacing of said transmitting transducers, and (g) a configuration of said receiving array to shape a beamformed directional reception response wherein receive grating lobes are at angles that are determined by spacing of said receiving transducers, and (h) said beamformed directional transmission response serves to suppress spurious system response effects of said receive grating lobes and said beamformed directional reception response serves to suppress spurious system response effects of said transmit grating lobes.

(i) signal means of processing signals to form image signals.

10. An imaging apparatus according to claim 9 where said transmitting transducers are directional transducers such that substantial additional suppression of said spurious system response effects of receive grating lobes is achieved due to a directional effect of said directional transducers.

11. An imaging apparatus according to claim 9 where a plurality of said receiving transducers are directional transducers such that substantial additional suppression of said spurious system response effects of transmit grating lobes is achieved due to a directional effect of said directional transducers.

12. An imaging apparatus according to claim 9 where coded transmit beam segments serve to identify range zones of said solid angle sector regions of said common field of view by respective codes of said coded transmit beam segments that focus within said range zones.

13. An imaging apparatus according to claim 9 where coded transmit beam segments serve to identify range zones of said common field of view by respective codes and said coded transmit beam segments focus within said range zones, and a combination of range zones and angle sectors serve to focus said radiated signals for an expected scene.

14. An imaging apparatus according to claim 9 and signal means to provide measurement of a total of distance from said transmitting array to a selected object and from said selected object to said receiving array.

15. An imaging apparatus according to claim 9 with signal means to allow for Doppler effect so as to compensate for motion of a selected collection of scattering centers in a scene such that only said selected collection of scattering centers is viewed.

16. A system comprising equipment according to claim 9 and an underwater vehicle.

17. An imaging apparatus comprising:

(a) a plurality of transmitting directional transducers in a linear transmitting array where said transmitting directional transducers simultaneously transmit radiated signals, and said radiated signals are radiated over a common field of view wherein objects modify said radiated signals to cause reflected signals, and (b) signal means of coding, phase adjusting, and distributing transmit signals that drive said transmitting directional transducers such that said radiated signals form into a plurality of simultaneous, coded transmit beams that serve to identify solid angle sector regions of said common field of view by respective codes of said coded transmit beams passing through respective said solid angle sector regions, and (c) a plurality of receiving directional transducers in a linear receiving array where said receiving transducers simultaneously sense said reflected signals, and thereby produce received signals, and (d) signal means of combining signals to form channels that are receive beams, and signal means of processing signals to separate coded signals such that code channels are formed where said code channels are associated with respective said coded transmit beams, such that for each of said receive beams there are as many said code channels as there are said coded transmit beams, and (e) said transmitting array and said receiving array are relatively oriented to enable formation of image signals where said coded transmit beams and said receive beams determine location of said objects in said common field of view, and (f) a configuration of said transmitting array to shape a beamformed directional transmission response wherein transmit grating lobes are at angles that are determined by spacing of said transmitting directional transducers, and said beamformed directional transmission response is substantially affected by transducer directionality, and (g) a configuration of said receiving array to shape a beamformed directional reception response wherein receive grating lobes are at angles that are determined by spacing of said receiving directional transducers, and said beamformed directional reception response is substantially affected by transducer directionality, (h) said beamformed directional transmission response serves to suppress spurious system response effects of said receive grating lobes and said beamformed directional reception response serves to suppress spurious system response effects of said transmit grating lobes, and (i) signal means of processing signals to form image signals.

18. An imaging apparatus according to claim 17 where coded transmit beam segments serve to identify range zones of said solid angle sector regions of said common field of view by respective codes of said coded transmit beam segments that focus within said range zones.

19. An imaging apparatus according to claim 17 where coded transmit beam segments serve to identify range zones of said common field of view by respective codes and said coded transmit beam segments focus within said range zones, and a combination of range zones and angle sectors serve to focus said radiated signals for an expected scene.

20. An imaging apparatus according to claim 17 and signal means to provide measurement of a total of distance from said transmitting array to a selected object and from said selected object to said receiving array.

21. An imaging apparatus according to claim 17 with signal means to allow for Doppler effect so as to compensate for motion of a selected collection of scattering centers in a scene such that only said selected collection of scattering centers is viewed.

22. A system comprising equipment according to claim 17 and an underwater vehicle.

23. A sensing apparatus comprising:

(a) a plurality of transmitting transducers in a transmitting array where said transmitting transducers simultaneously transmit radiated signals, and said radiated signals are radiated over a common field of view wherein objects modify said radiated signals to cause reflected signals, and (b) signal means of phase adjusting, and distributing transmit signals that drive said transmitting transducers such that said radiated signals form into transmit beams that pass through solid angle sector regions of said common field of view, and (c) a plurality of receiving transducers in a receiving array where said receiving transducers simultaneously sense reflected signals, and thereby produce received signals, end (d) signal means of combining said received signals to form virtually simultaneous channels that are receive beams, and (e) a configuration of said transmitting array to shape a beamformed directional transmission response wherein transmit grating lobes are at angles that are determined by spacing of said transmitting transducers, and (f) a configuration of said receiving array to shape a beamformed directional reception response wherein receive grating lobes are at angles that are determined by spacing of said receiving transducers, and (g) an orientation of said transmitting array and said receiving array to enable said transmit beams and said receive beams to resolve said common field of view, and (h) said beamformed directional transmission response serves to suppress spurious system response effects of said receive grating lobes and said beamformed directional reception response serves to suppress spurious system response effects of said transmit grating lobes, and (i) signal means of processing signals to form sensing signals where the location of said objects is determined by said transmit beams and said receive beams.

24. A sensing apparatus according to claim 23 and signal means of coding said transmit signals such that said transmit beams are simultaneous, coded transmit beams that serve to identify said solid angle sector regions by codes of said coded transmit beams passing through respective said solid angle sector regions, and signal means of processing said received beams to separate coded signals and to form a code channel for each code where code channels are associated with respective said coded transmit beams.

25. A sensing apparatus according to claim 23 where a plurality of said transmitting transducers are transmitting directional transducers such that significant suppression of grating lobes is achieved due to directional effects of said transmitting directional transducers.

26. A sensing apparatus according to claim 23 where a plurality of said receiving transducers are receiving directional transducers such that significant suppression of the system response effect of grating lobes is achieved due to directional effects of said receiving directional transducers.

27. A sensing apparatus according to claim 23 and signal means of coding said transmit signals to enable formation of simultaneous, coded transmit beam segments that serve to identify range zones of said solid angle sector regions of said common field of view by respective codes of said coded transmit beam segments that focus within said range zones, and signal means to form respective code channels after reception.

28. A sensing apparatus according to claim 23 and signal means of coding said transmit signals to enable formation of simultaneous, coded transmit beam segments that serve to identify range zones of said common field of view by respective codes and said coded transmit beam segments focus within said range zones, and a combination of range zones and angle sectors serve to focus said radiated signals for an expected scene, and signal means to form respective code channels after reception.

29. A sensing apparatus according to claim 23 and signal means to provide measurement of a total of distance from said transmitting array to a selected object and from said selected object to said receiving array.

30. A sensing apparatus according to claim 23 with signal means to allow for Doppler effect so as to compensate for motion of a selected collection of scattering centers in a scene such that only said selected collection of scattering centers is viewed.

31. A system comprising equipment according to claim 23 and a vehicle.

32. A sensing apparatus according to claim 23 where said sensing signals are formed into image signals.

33. A sensing apparatus according to claim 23 with an additional array in an orientation that enables formation of image signals that enable a stereo display.

34. A sensing apparatus comprising:

(a) a transmitting system that transmits radiated signals to cover a common field of view wherein objects modify said radiated signals to cause reflected signals, and (b) two receiving arrays, each comprising a plurality of transducers, where said transducers simultaneously sense said reflected signals and thereby produce received signals, and said two receiving arrays are relatively oriented to enable said two receiving arrays to resolve said objects in said common field of view, and (c) signal means for each of said two arrays, whereby said received signals from an array are combined with other signals from said array to form channels that are receive beams that are associated with said array, and (d) signal means of processing signals from said channels to form sensing signals, and (e) said two receiving arrays each have a plurality of dimensions, and within each said array said transducers are arranged to shape a beamformed directional response of each said array wherein grating lobes are at angles that are determined by spacing of said transducers, and (f) said beamformed directional response of each said array serves to suppress spurious system response effects of said grating lobes of the opposite said array.

35. A sensing apparatus according to claim 34 where a plurality of said transducers are directional transducers and said directional transducers have a substantial effect on said beamformed directional response.

36. A sensing apparatus according to claim 34 where the effect of a dimension of said array is emulated by an effect of directional transducers where said beamformed directional response is partly and substantially determined by directional effects of said directional transducers.

37. A sensing apparatus according to claim 34 and signal means to provide measurement a total distance from said transmitting system to a selected object and from said selected object to said two receiving arrays.

38. A sensing apparatus according to claim 34 and signal means to allow for Doppler effect so as to compensate for motion of a selected collection of scattering centers in a scene such that only said collection of scattering centers is viewed.

39. A sensing apparatus according to claim 34 and a vehicle.

40. A sensing apparatus according to claim 34 where said sensing signals are formed into image signals.

41. A sensing apparatus according to claim 34 with an additional array in an orientation that enables formation of image signals that enable a stereo display.

42. An imaging apparatus comprising:

(a) a plurality of transducers in a transmitting array where said transducers simultaneously transmit signals, and said signals are mutually phase related and are radiated over a common field of view wherein objects modify radiated signals, and said transducers are arranged to shape a beamformed directional transmitting response, and (b) signal means of generating, phase adjusting and distributing phase related transmit signals to cause simultaneous, coded signal transmit beams to form in respective transmit regions of said common field of view so as to identify said transmit regions by a unique code of a beam passing through a region, and (c) a plurality of transducers in a receiving array where said transducers simultaneously receive signals, and said signals are mutually phase related and are radiated from common points in said common field of view after modification by said objects, and said transducers are arranged to shape a beamformed directional receiving response, and (d) signal means of phase adjusting and combining received signals to cause receive beam channels to form where said receive beam channels are associated with respective receive regions of said common field of view, and (e) signal means of processing signals, from each of said receive beam channels, to separate coded signals and to form code channels for respective unique codes, where said code channels are associated with respective said transmit regions, and (f) a predetermined relative orientation of said transmitting array and said receiving array to enable said transmit regions and said receive regions to determine locations, in two angular dimensions, of respective said objects in said common field of view, and (g) signal means of processing signals to form image signals.

43. An imaging apparatus according to claim 42 where said plurality of transducers in a transmitting array are directional transducers.

44. An imaging apparatus according to claim 42 with a modified arrangement of signal means of (d) and (e), where said modified arrangement comprises:

signal means of processing received signals to separate coded signals and to form code channels for respective unique codes, where said code channels are associated with said respective transmit regions, and signal means of phase adjusting and combining signals from said code channels to cause receive beam channels to form where said receive beam channels are associated with respective receive regions of said common field of view.

45. An imaging apparatus according to claim 42 with signal means to allow for Doppler effect so as to compensate for motion of a selected collection of scattering centers in a scene such that only said selected collection of scattering centers is viewed.

46. An imaging apparatus according to claim 42 where coded transmit beam segments serve to identify range zones of said solid angle sector regions of said common field of view by respective codes of said coded transmit beam segments that focus within said range zones.

47. An imaging apparatus according to claim 42 where coded transmit beam segments serve to identify range zones of said common field of view by respective codes and said coded transmit beam segments focus within said range zones, and a combination of range zones and angle sectors serve to focus said radiated signals for an expected scene.

48. An imaging apparatus according to claim 42 with equipment to provide measurement of a total of a distance from the transmitting array to each target and a distance back to the receiving array.

49. A system comprising equipment according to claim 42 and an underwater vehicle.

* * * * *